(45.)
F. E. DAY.
Improvement in Cheese Vats.
No. 122,232.    Patented Dec. 26, 1871.
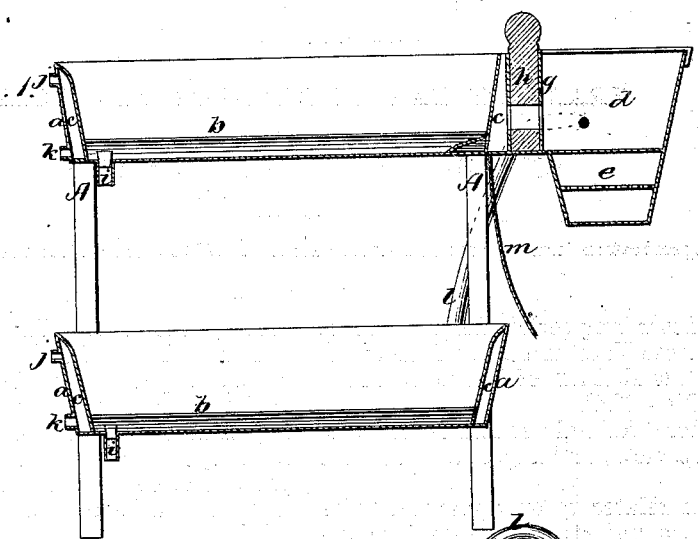
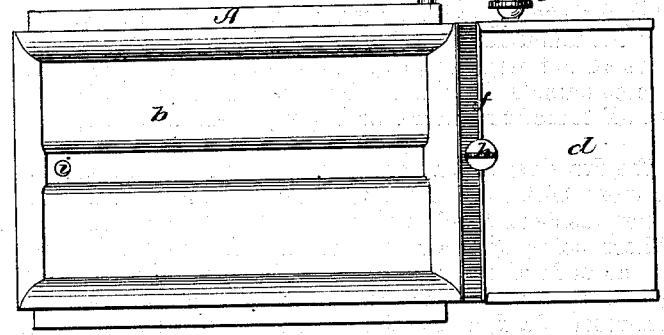
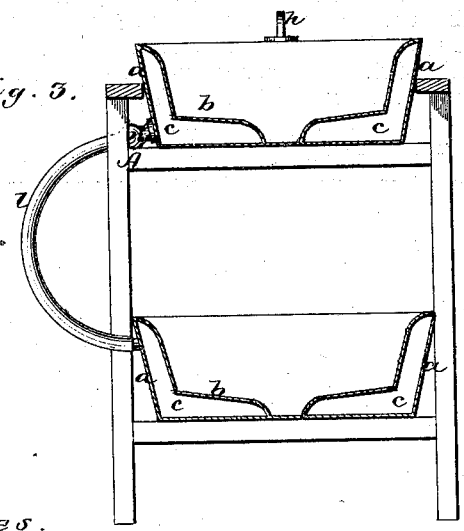
Witnesses.
C. F. Brown.
C. O. Brown.
Inventor.
Francis E. Day,
by Geo. E. Brown,
Atty.

UNITED STATES PATENT OFFICE.

FRANCIS E. DAY, OF KENNEDY, NEW YORK.

IMPROVEMENT IN CHEESE-VATS.

Specification forming part of Letters Patent No. 122,232, dated December 26, 1871.

Specification describing certain Improvements in Combined Cheese-Vats and Milk-Coolers, invented by FRANCIS E. DAY, of Kennedy, Chautauqua county, New York.

Figure 1 is a longitudinal vertical central section; Fig. 2, a top view; and Fig. 3, a transverse vertical section.

This invention relates to an apparatus to be used either in the manufacture of cheese, for heating milk by means of hot water, or, in the manufacture of butter, for cooling milk by means of cold water, or in the manufacture of both butter and cheese at the same time, in any case the water being conducted outside the pans holding the milk and drawn off therefrom after discharging their function.

Referring to the drawing, A is a wooden frame holding one or more horizontal pans, $a$, placed one above another, inside of which are pans $b$ for holding milk, there being spaces $c$ between the bottoms, sides, and ends of the inner pans, and the same parts of the outer pans for the flow of water. A water-reservoir, $d$, is attached to one end of the uppermost pan $a$, to the bottom of which reservoir is fastened a furnace, $e$. The dividing wall $f$ between the reservoir $d$ and the pan $a$ has set in it a vertical tube, $g$, with a slot in each side, thus establishing communication between the reservoir and the pan, a cock, $h$, being placed in the tube $g$ to govern the flow of water through the latter. Tubes $i$ for drawing off milk run through both the inner and outer pans. Waste-ways $j$ are placed near the tops of the pans $a$, and at the bottoms of these pans are tubes $k$ for drawing off all the water. A pipe, $l$, provided with a cock, $n$, connects the reservoir $d$ with the lower pan $a$, and between the latter and the furnace $e$ is situated a fender, $m$.

Whether cheese or butter, or both, are to be manufactured, the reservoir $d$ is filled with water. To make cheese, a fire is lighted in the furnace and hot water sent into all the spaces $c$. To make cheese in the upper pan and, at the same time, cream in the lower one, the cock $n$ must be closed before lighting the fire. Then the fender $m$ prevents the lower pan from heating. For making cream in all the pans, ice may be placed, in warm weather, in the reservoir $d$ to cool the water.

An ordinary dairyman's outfit for making butter costs from one hundred to two hundred dollars, and a separate outfit for cheese costs as much more. My apparatus, combining both outfits in one, reduces the expense by one-half.

I claim as my invention—

The furnace $e$, water-reservoir $d$, pans $a$ $b$, fender $m$, and tubes $g$ $l$ provided with suitable cocks, all arranged as specified.

FRANCIS E. DAY.

Witnesses:
T. L. CAMP,
H. D. LITCHFIELD.

(45)